(12) United States Patent
Li et al.

(10) Patent No.: US 11,936,049 B2
(45) Date of Patent: Mar. 19, 2024

(54) BATTERY UNIT AND BATTERY MODULE

(71) Applicant: Contemporary Amperex Technology Co., Limited, Ningde (CN)

(72) Inventors: Xing Li, Ningde (CN); Xiangyan Bu, Ningde (CN); Qingyuan Jiang, Ningde (CN); Guijiu Qu, Ningde (CN); Xiaowen Zhang, Ningde (CN); Quankun Li, Ningde (CN); Lingbo Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 42 days.

(21) Appl. No.: 16/732,615

(22) Filed: Jan. 2, 2020

(65) Prior Publication Data
US 2020/0343559 A1 Oct. 29, 2020

(30) Foreign Application Priority Data
Apr. 25, 2019 (CN) .......................... 201910337415.0

(51) Int. Cl.
*H01M 50/531* (2021.01)
*H01M 4/70* (2006.01)
(Continued)

(52) U.S. Cl.
CPC ........... *H01M 4/70* (2013.01); *H01M 50/531* (2021.01); *H01M 50/209* (2021.01);
(Continued)

(58) Field of Classification Search
None
See application file for complete search history.

(56) References Cited

U.S. PATENT DOCUMENTS

| | | |
|---|---|---|
| 9,853,294 B2 | 12/2017 | Lee et al. |
| 10,826,047 B2 | 11/2020 | Guo et al. |

(Continued)

FOREIGN PATENT DOCUMENTS

| | | |
|---|---|---|
| CN | 108198989 A | 6/2018 |
| CN | 108199072 A | 6/2018 |

(Continued)

OTHER PUBLICATIONS

Hwang, KR 2003-0066172 Machine Translation (Year: 2003).*
(Continued)

*Primary Examiner* — Ula C Ruddock
*Assistant Examiner* — Anna Korovina
(74) *Attorney, Agent, or Firm* — Sterne, Kessler, Goldstein & Fox P.L.L.C.

(57) ABSTRACT

The present disclosure relates to a battery unit and a battery module, the battery unit includes an electrode assembly, including a main body portion and a tab; two electrode terminals; and two current collecting members respectively connecting the tabs on both sides of the main body portion with the respective electrode terminals; the current collecting member includes a guiding plate and a supporting plate, the guiding plate is located on one side of the main body portion along the length direction, a reinforcement portion is arranged on the guiding plate and is configured to reduce the deformation of the guiding plate towards the main body portion; and the supporting plate is connected to an end of the guiding plate along the width direction, the tab is bent relative to the length direction and connected to the supporting plate. The battery unit can reduce the bending deformation of the guiding plate.

16 Claims, 10 Drawing Sheets

(51) Int. Cl.
*H01M 50/209* (2021.01)
*H01M 50/278* (2021.01)
*H01M 50/533* (2021.01)
*H01M 50/536* (2021.01)
*H01M 50/538* (2021.01)

(52) U.S. Cl.
CPC ........ *H01M 50/278* (2021.01); *H01M 50/533* (2021.01); *H01M 50/536* (2021.01); *H01M 50/538* (2021.01)

(56) References Cited

U.S. PATENT DOCUMENTS

| | | | |
|---|---|---|---|
| 10,910,622 B2 | 2/2021 | Yang et al. | |
| 2006/0051664 A1 | 3/2006 | Tasai et al. | |
| 2011/0039152 A1* | 2/2011 | Kim et al. | H01M 50/20 429/178 |
| 2012/0164501 A1* | 6/2012 | Guen et al. | H01M 50/538 429/94 |
| 2012/0205971 A1* | 8/2012 | Choo | H01M 50/20 429/99 |
| 2013/0330593 A1* | 12/2013 | Moon et al. | H01M 50/531 429/149 |
| 2014/0315073 A1* | 10/2014 | Dukjung et al. | H01M 50/531 429/160 |
| 2015/0111090 A1 | 4/2015 | Lee et al. | |
| 2015/0155528 A1* | 6/2015 | Takahashi et al. | H01M 50/116 429/163 |
| 2019/0067667 A1 | 2/2019 | Jang et al. | |
| 2019/0221819 A1 | 7/2019 | Xing et al. | |

FOREIGN PATENT DOCUMENTS

| | | | | |
|---|---|---|---|---|
| CN | 108258180 | | 7/2018 | |
| CN | 108598353 | A | 9/2018 | |
| CN | 208014793 | U | 10/2018 | |
| CN | 108735957 | A | 11/2018 | |
| CN | 109360932 | A | 2/2019 | |
| EP | 3451415 | | 3/2019 | |
| EP | 3451416 | | 3/2019 | |
| EP | 3451417 | | 3/2019 | |
| EP | 3451418 | | 3/2019 | |
| JP | 2005142026 | A | 6/2005 | |
| JP | 2013008559 | A | 1/2013 | |
| JP | 2018190546 | A | 11/2018 | |
| KR | 20030066172 | * | 8/2003 | ............. Y02E 60/10 |

OTHER PUBLICATIONS

Extended European Search Report for European Application No. 19219899.2, European Patent Office, Munich, Germany, dated Jul. 16, 2020, 7 pages.

Notice of Reasons for Refusal received in JP2021-555808, dated Sep. 14, 2023, 4 pages.

Office Action directed to related Indian Patent Application No. 202117038455, dated Sep. 1, 2022; 6 pages.

International Search Report in related International Application No. PCT/CN2020/078804 dated Jun. 9, 2020, 18 pages.

* cited by examiner

BATTERY UNIT AND BATTERY MODULE

The present application claims priority of Chinese application No. 201910337415.0, filed on Apr. 25, 2019. The disclosed content of the Chinese application is hereby entirely incorporated into the present disclosure.

FIELD OF THE DISCLOSURE

The present disclosure relates to the technical field of batteries, and in particular relates to a battery unit and a battery module.

BACKGROUND OF THE DISCLOSURE

In recent years, rechargeable batteries have been widely used to provide power for high-power devices, such as electric vehicles and the like. The rechargeable batteries achieve greater capacity or power by connecting a plurality of battery units in series or in parallel.

The existing battery unit is provided with an electrode assembly in the shell, the electrode assembly is formed by superposing and winding a positive electrode pole piece, a diaphragm and a negative electrode pole piece, the positive electrode pole piece and the negative electrode pole piece respectively include a coated portion and an uncoated portion, the uncoated portion forms a tab, and the tabs on both sides of the electrode assembly are respectively connected with positive and negative electrode poles at the top of the shell through current collecting members.

In the related art known by the inventors, the current collecting members on the both sides of the electrode assembly adopt bending structures, so as to improve the reliability of welding and fixing with the tabs by increasing its own structural strength, and the tabs are fitted and fold back together with the outer side faces of the bending structures. During the use, this battery unit has the problems of poor electrochemical performance and safety performance.

SUMMARY OF THE DISCLOSURE

Embodiments of the present disclosure provide a battery unit and a battery module capable of improving electrochemical performance of a battery.

One aspect of the present disclosure provides a battery unit, including:

an electrode assembly, including a main body portion and a tab extending from an end of the main body portion along a length direction of the electrode assembly;

two electrode terminals arranged at the top of the electrode assembly; and two current collecting members respectively electrically connecting the tabs on both sides of the main body portion with the respective electrode terminals on the same side;

wherein each current collecting member includes a guiding plate and a supporting plate, the guiding plate is located on one side of the main body portion along the length direction and extends along a width direction of the electrode assembly, a reinforcement portion is arranged on the guiding plate and is configured to reduce the deformation of the guiding plate towards the main body portion; and the supporting plate is connected to an end of the guiding plate along the width direction, and the tab is bent relative to the length direction and connected to the supporting plate.

In some embodiments, the reinforcement portion includes a rib, and the rib extends along a height direction of the electrode assembly or extends obliquely relative to the height direction.

In some embodiments, the reinforcement portion includes a plurality of ribs arranged at intervals; or the reinforcement portion comprises a plurality groups of ribs, wherein the ribs in each group are arranged at intervals, and at least two groups of the ribs are arranged staggered.

In some embodiments, one side of the rib adjacent to the electrode assembly recesses inward relative to the guiding plate.

In some embodiments, one side of the reinforcement portion away from the electrode assembly protrudes outward relative to the guiding plate.

In some embodiments, the supporting plate includes a connecting portion and a bending portion, the bending portion is connected with the guiding plate and is bent into an arc shape, and the tab is connected to the connecting portion and is entirely folded along the surface of the bending portion to one side of the guiding plate away from the main body portion.

In some embodiments, the reinforcement portion includes a rib, the rib includes a first rib, the first rib is covered by the connecting portion on the width direction, the first rib has a first protruding height relative to the guiding plate, the bending portion has a third protruding height relative to the guiding plate, and the first protruding height is less than or equal to the third protruding height.

In some embodiments, two supporting plates are respectively connected to the two ends of the guiding plate along the width direction and are bent towards each other, and the connecting portions of the two supporting plates are arranged at intervals along the width direction; and the ribs further includes a second rib, two segments of first rib are covered by the two connecting portions, the second rib is located between the two segments of first rib, and the second rib is located in an interval area of the two connecting portions.

In some embodiments, the second rib has a second protruding height relative to the guiding plate, and the second protruding height is greater than or equal to the first protruding height.

In some embodiments, the bending portion is provided with at least one of a slot and a groove extending along a height direction of the electrode assembly, the slot is formed in an intermediate area of the bending portion along the height direction, and the groove is arranged on an inner side of the bending portion and is located in at least one of an area above the slot and an area below the slot.

In some embodiments, the reinforcement portion crosses the supporting plate along a height direction of the electrode assembly.

In some embodiments, the battery unit further includes a top cover plate and an insulator, the electrode terminals are arranged on the top cover plate, and the insulator is arranged between the top cover plate and the electrode assembly; and the two current collecting members include a first current collecting member located on one side of the electrode assembly, the two electrode terminals include a negative terminal, the first current collecting member connects the tab on the same side with the negative terminal, and the reinforcement portion of the first current collecting member extends to the bottom side of the insulator along a height direction of the electrode assembly.

In some embodiments, the two current collecting members include a second current collecting member located on one side of the electrode assembly, the two electrode terminals include a positive terminal, the second current collecting member connects the tab on the same side to the positive terminal, the second current collecting member further includes a heat dissipation portion, which is arranged in an area of the guiding plate located above the supporting plate.

In some embodiments, the reinforcement portion of the second current collecting member extends to the bottom of the heat dissipation portion along a height direction of the electrode assembly.

In some embodiments, the current collecting member further includes a clamping portion, and the clamping portion is arranged at the bottom of the guiding plate and entirely protrudes toward one side away from the electrode assembly.

In some embodiments, along the length direction, the surface of the clamping portion away from the guiding plate is not higher than the surface of the tab away from the guiding plate after being folded back.

The other aspect of the present disclosure provides a battery module, including:

a plurality of battery units in the above embodiments, wherein the battery units are arranged side by side along the width direction.

Based on the above technical solutions, the battery unit of some embodiments of the present disclosure, by disposing the reinforcement portion on the guiding plate of the current collecting member, the sectional bending rigidity of the guiding plate perpendicular to the height direction of the electrode assembly can be improved, when the tab and the supporting plate are bent and flattened, the reinforcement portion can reduce the bending deformation of the guiding plate towards the main body portion of the electrode assembly, so as to prevent the active material coated on each pole piece in the electrode assembly from being affected, so the electrochemical performance and the safety performance of the battery unit can be improved.

BRIEF DESCRIPTION OF THE ACCOMPANYING DRAWINGS

The drawings described herein are used for providing a further understanding of the present disclosure and constitute a part of the present application. The illustrative embodiments of the present disclosure and the descriptions thereof are used for explaining the present disclosure and do not constitute an undue limitation to the present disclosure. In the drawings.

REFERENCE SIGNS

Figure 1:
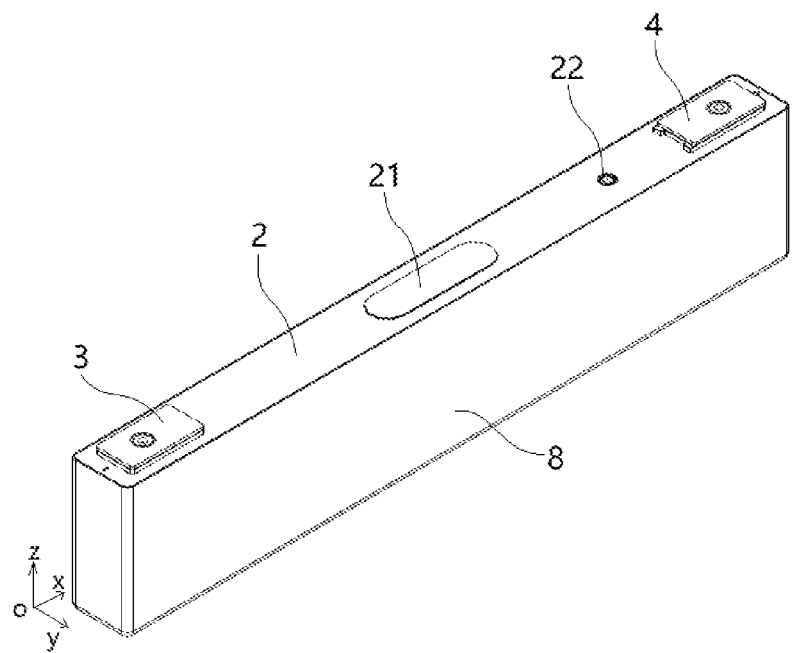
FIG. 1 is a structural schematic diagram of some embodiments of a battery unit of the present disclosure.

1, electrode assembly; 11, tab; 12, main body portion; 2, top cover plate; 21, exhaust member; 22, liquid injection hole; 3, negative terminal; 4, positive terminal; 5, first current collecting member; 51, guiding plate; 511, rib; 512, clamping portion; 52, supporting plate; 521, connecting portion; 522, bending portion; 523, slot; 524, groove; 53, adapter plate; 54, heat dissipation portion; 6, second current collecting member; 7, insulator; 8, shell; 9, insulating film.

DETAILED DESCRIPTION OF THE PREFERRED EMBODIMENTS

The present disclosure is described in detail below. In the following paragraphs, different aspects of the embodiments are defined in more details. The aspects so defined can be combined with any other one or more aspects, unless clearly indicated that they are not combinable. In particular, any feature that is considered to be preferred or advantageous can be combined with other one or more features that are considered to be preferred or advantageous.

The terms "first", "second" and the like appearing in the present disclosure are merely for the convenience of description to distinguish different assemblies having the same name, and do not indicate sequential or primary and secondary relationships.

In addition, when an element is referred to as being "on" another element, the element can be directly on the other element or indirectly on the other element and one or more intermediate elements are inserted therebetween. In addition, when an element is referred to as being "connected to" another element, the element can be directly connected to the other element or can be indirectly connected to the other element and one or more intermediate elements are inserted therebetween. In the following description, the same reference signs denote the same elements.

In order to clearly describe various orientations in the following embodiments, for example, various directions of a battery unit are defined in a coordinate system in FIG. 1, and the x direction represents the length direction of an electrode assembly; the y direction is perpendicular to the x direction in the horizontal plane and represents the width direction of the electrode assembly; and the z direction is perpendicular to a plane formed by the x and y directions and represents the height direction of the electrode assembly. Based on this orientation definition, the description of the orientation or positional relationships indicated by "upper", "lower", "top", "bottom", "front", "back", "inside" and "outside" and the like, it only for the convenience of describing the present disclosure, rather than indicating or implying that the device referred to must have a specific orientation and must be constructed and operated in a particular orientation, and thus cannot be construed as limitation to the protection scope of the present disclosure.

After noticing that the existing battery unit has the problems of poor electrochemical performance and safety performance, the inventors find that an active material coated on a pole piece in the electrode assembly has the phenomena of coating and powder falling off, and thus speculate that the pole piece may be subjected to an external force in an assembly process of the battery unit.

Figure 9:
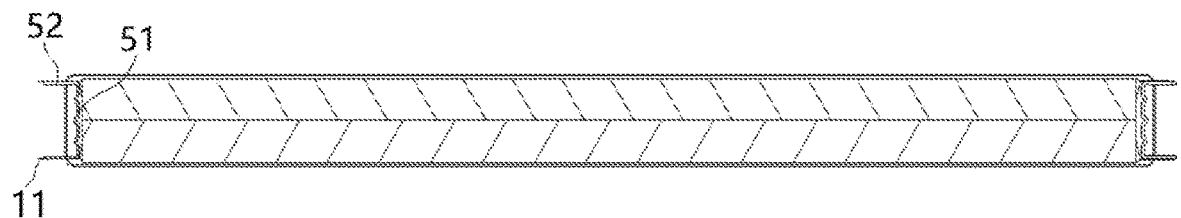
FIG. 9 is a D-D section view in FIG. 8, and show a state of the tabs being not folded back.
Figure 10:
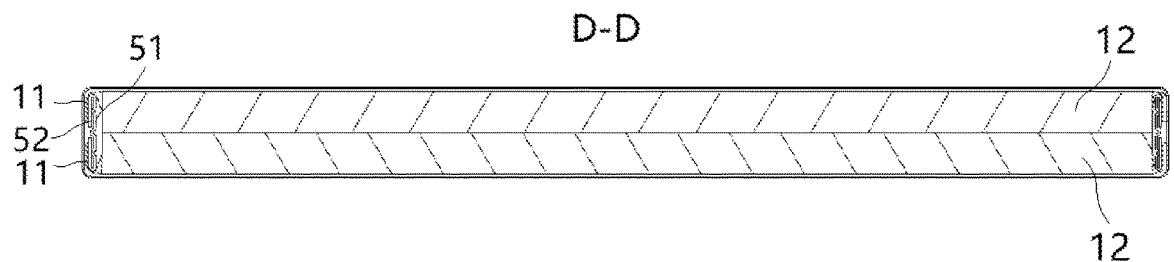
FIG. 10 is D-D section view in FIG. 8, and show a state of the tabs being folded back.

By analyzing the assembly process of the battery unit, referring to FIG. 9 and FIG. 10, in a process of bending tabs 11 on both sides together with a supporting plate 52 of a current collecting member, forces need to be applied to the outer sides of the tabs 11 via rollers to gradually fold back the tabs 11 inward at first, after the tabs are substantially folded back in place, a side surface of a guiding plate 51 of the current collecting member away from a main body portion 12 of the electrode assembly is placed upward, and the tabs 11 on both sides are flattened by flat plate structures, and the flat plate structures cover areas corresponding to the two tabs 11. When pressures are applied to the tabs 11 on the both sides by the flat plate structures, the current collecting member generates deformation towards the main body portion 12 and presses the main body portion 12 to transfer the pressure to at least a part of pole piece in the main body portion 12, such that the pole piece coated with the active material is easily subjected to a mechanical force to generate coating or power falling off, thereby affecting the electrochemical performance and safety performance of the battery unit.

In order to verify this analysis, the inventors detect the deformation amount of the guiding plate 51 after the tabs 11 and the supporting plate 52 are folded back and flattened by using a dial indicator in the assembly process, and find that the guiding plate 51 generates a relatively large deformation amount toward the main body portion 12.

In order to reduce the deformation amount of the guiding plate 51, one improvement method is to dispose clamping portions on both sides of the guiding plate 51 along the height direction of the tab 11, and the clamping portions protrude outward relative to the guiding plate 51, and the inner side of the clamping portions are concave. In the process of bending and flattening the tabs, a tool is inserted in a concave portion of the clamping portion towards the main body portion 12 to provide a supporting force, although the deformation amount of the guiding plate 51 can be reduced in this way, relatively great depression deformation is still generated in the intermediate area when the tabs are bent in the two-end supporting structure, and the deformation problem of the current collecting member cannot be substantially improved. Moreover, the insertion of the tool on the inner side of the clamping portion requires high precision requirements on the assembly equipment, so that the assembly is relatively difficult in practice, and the assembly efficiency is low. Therefore, the battery unit needs to be further improved.

In order to make those skilled in the art clearly understand the improvement of the present disclosure, the overall structure of the battery unit is described at first.

FIG. 1 shows a structural schematic diagram of some embodiments of the battery unit of the present disclosure. The battery unit includes an electrode assembly 1, a top cover plate 2, two electrode terminals and two current collecting members.

Wherein the electrode assembly 1 includes a main body portion 12 and a tab 11 extending from an end of the main body portion 12 along the length direction of the electrode assembly 1. The length direction is the connection direction of the tabs 11 corresponding to the two electrode terminals respectively. Wherein the main body portion 12 is a coated portion of an electrode, and includes a first electrode and a second electrode with opposite polarities, for example, the first electrode is a negative electrode, and the second electrode is a positive electrode. The tab 11 is an uncoated portion which can respectively extend outward from both ends of the main body portion 12 along the length direction.

Figure 2:
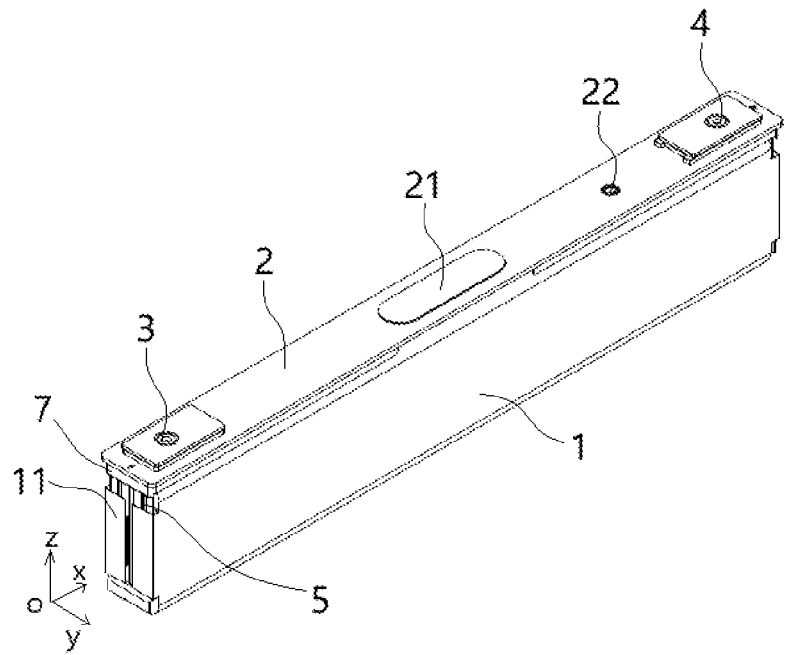
FIG. 2 is a schematic diagram of an internal structure of some embodiments of the battery unit of the present disclosure.

In the schematic diagram of an internal structure of the battery unit shown in FIG. 2, the top cover plate 2 is arranged at the top of the electrode assembly 1, and an insulator 7 is arranged between the top cover plate 2 and the electrode assembly 1, for example, the insulator 7 can be of a platy structure matching the top cover plate 2 and can be made of a plastic cement material. The top cover plate 2 is provided with an exhaust member 21 and a liquid injection hole 22, the exhaust member 21 is used for releasing a gas in the battery unit to achieve a safety function, the liquid injection hole 22 is used for injecting electrolyte into the battery unit and is sealed by a sealing member. The two electrode terminals are arranged on both ends on the top cover plate 2 along the length direction, and the two electrode terminals include a negative terminal 3 connected to the negative electrode and a positive terminal 4 connected to the positive electrode.

Figure 4:
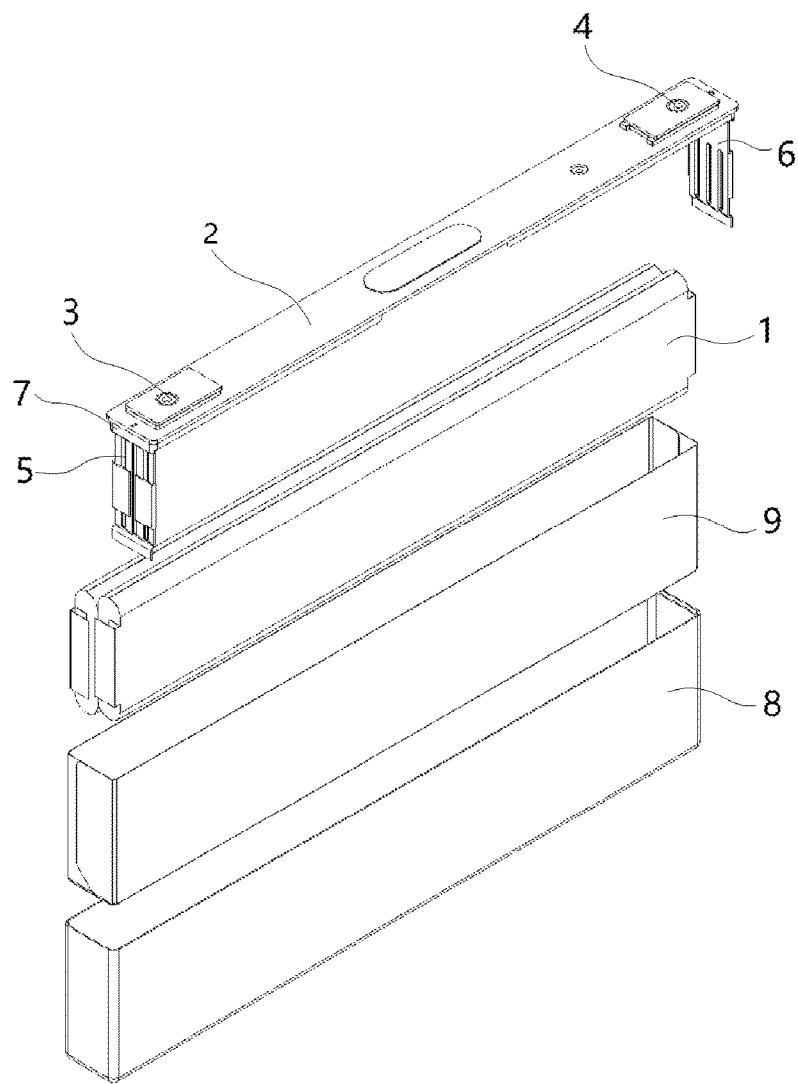
FIG. 4 is an exploded view of the battery unit as shown in FIG. 1.

FIG. 4 shows an exploded view of some embodiments of the battery unit, the two current collecting members include a first current collecting member 5 and a second current collecting member 6, the first current collecting member 5 and the second current collecting member 6 electrically connect the tabs 11 on both sides of the main body portion 12 along the length direction with the respective terminal on the same side. Referring to FIG. 9 and FIG. 10, the first current collecting member 5 or the second current collecting member 6 includes a guiding plate 51 and a supporting plate 52, the guiding plate 51 is located on one side of the main body portion 12 along the length direction and extends along the width direction, the supporting plate 52 is connected to the end of the guiding plate 51 along the width direction. The tab 11 is bent relative to the length direction and connected to the supporting plate 52, for example, the tab 11 and the supporting plate 52 can be connected by welding. As shown in FIG. 10, the tab 11 is attached to the outer side of the supporting plate 52 and bent towards the inner side of the guiding plate 51 together with the supporting plate 52; or the tab 11 is attached to the outer side of the supporting plate 52 and bent towards the outer side of the guiding plate 51 together with the supporting plate 52, and the guiding plate 51 and the supporting plate 52 can form flat plate structures after bending the first current collecting member 5 or the second current collecting member 6.

When the battery unit is used independently, a shell 8 connected with a cover plate is further arranged at the outside of the electrode assembly 1, and the shell 8 is filled with electrolyte. When a battery module is formed by a plurality of battery units, the battery module includes a battery frame and the plurality of battery units, the battery units are arranged in the battery frame and are arranged side by side along the width direction, and can adopt at least one of parallel connection and series connection, the battery units can be singly arranged in the shell 8, or the shell 8 is omitted. At least one of parallel connection and series connection can be adopted.

A single electrode assembly 1 can be arranged in the battery unit, which is suitable for the situation in which the stacking thickness of the electrode layers is relatively small. When the stacking thickness of the electrode layers is relatively large, two or more independently wound electrode assemblies 1 can be arranged in the battery unit, and the tabs 11 of all the respective electrode assemblies 1 are respectively led out from both sides of the main body portion 12 along the width direction. When the winding thickness of the electrode assembly 1 is relatively large, the size of a circular arc at the bottom is relatively large, such that the space utilization rate of the electrode assembly 1 on the outer sides of the circular arcs on the both sides of the bottom is low, if the electrode assembly is splitting into a plurality of electrode assemblies 1, the size of the circular arc can be reduced, the bottom space of the battery unit is fully used, the space waste is reduced, and the energy density of the main body portion is increased. Moreover, the total thickness of the tabs 11 is also reduced, which also facilitates bending after welding, and the length of the single tab 11 can be reduced.

Figure 3:
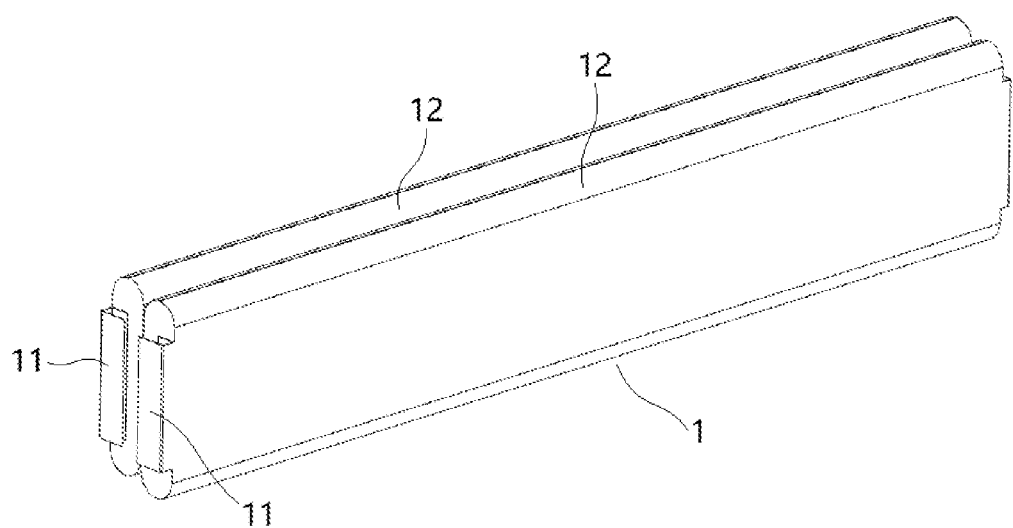
FIG. 3 is a structural schematic diagram of some embodiments of an electrode assembly in the battery unit of the present disclosure.

FIG. 3 shows a structural schematic diagram of some embodiments of the electrode assembly. Two electrode assemblies 1 are superposed along the width direction, and the tabs 11 of the two electrode assemblies 1 are respectively led out from the two sides of the main body portions 12 along the width direction, and are bent towards each other from the both sides of the guiding plate 51 along the width direction together with the supporting plate 52.

FIG. 4 shows an exploded view of some embodiments of the battery unit. The two current collecting members include a first current collecting member 5 and a second current collecting member 6, which are arranged on both ends of the top cover plate 2 along the length direction, the first current collecting member 5 is connected to the negative terminal 3, and the second current collecting member 6 is connected with the positive terminal 4. The first current collecting member 5 and the second current collecting member 6 are respectively located on the both sides of the electrode assembly 1 along the length direction. In order to ensure insulation between the electrode assembly 1 and the shell 8, an insulating film 9 is arranged between the electrode assembly 1 and the shell 8, the insulating film 9 is attached to an inner surface of the shell 8, or coated on an outer surface of the electrode assembly 1, and the insulating film 9 can be pre-folded into a shape matching the shell 8.

On the basis of the overall structure of the battery unit given above, the improvement of the present disclosure is described below with reference to the structural schematic diagram of the first current collecting member 5 shown in FIG. 12, but the embodiments given below are not limited to the features in FIG. 12.

Figure 12:
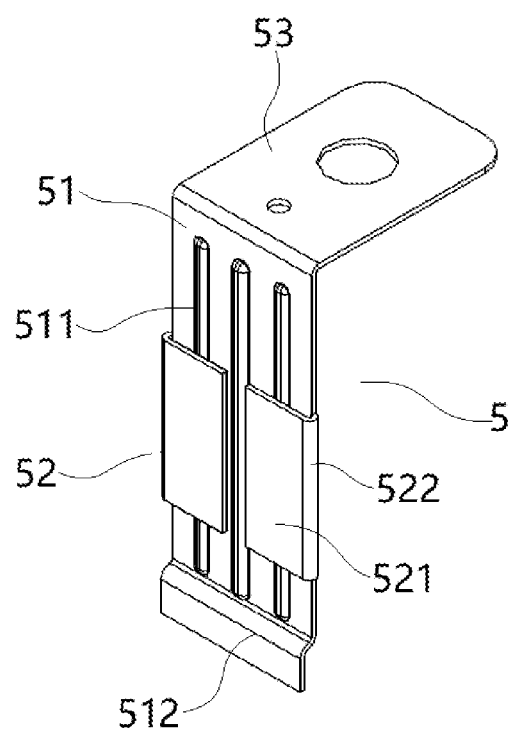
FIG. 12 is a space diagram of some embodiments of a first current collecting member (corresponding to a positive terminal) in the battery unit of the present disclosure.

In combination with FIG. 2 and FIG. 12, the first current collecting member 5 or the second current collecting member 6 includes a guiding plate 51, a supporting plate 52 and an adapter plate 53. The guiding plate 51 is located at a side of the main body portion 12 along the length direction and extends along the width direction, and preferably, the thickness direction of the guiding plate 51 is parallel to the length direction; the supporting plate 52 is connected to the end of the guiding plate 51 along the width direction, the tab 11 is connected to the supporting plate 52, the height of the supporting plate 52 is not less than a preset height, so as to reduce the resistance of the first current collecting member 5 or the second current collecting member 6, and to prevent a relatively large temperature rise of the main body portion during use; the adapter plate 53 is arranged at the top end of the guiding plate 51 and extends toward the inner side along the length direction of the main body portion 12, and the adapter plate 53 is provided with a hole for mounting the electrode terminals. The guiding plate 51 is provided with a reinforcement portion configured to reduce the deformation amount of the guiding plate 51 towards the main body portion 12.

In the embodiments of the present disclosure, by disposing the reinforcement portion on the guiding plate 51, the sectional bending rigidity of the guiding plate 51 perpendicular to the height direction of the electrode assembly 1 can be improved, after the tab 11 and the supporting plate 52 are folded back inward together, when a pressure is applied to the outer side of the tab 11 through the flat plate structure, the bending deformation of the guiding plate 51 towards the main body portion 12 can be reduced, the active material coated on each pole piece in the electrode assembly 1 is prevented from being affected, so the electrochemical performance and the safety performance of the battery unit can be improved. Moreover, compared with the solution in which the clamping portions are arranged on the both sides of the guiding plate along the height direction of the tab, the embodiments of the present disclosure can reduce the deformation amount from the perspective of increasing the own rigidity of the current collecting member, which can reduce the accuracy requirements on the assembly equipment and prevent stress concentration at the location of the upper clamping portion.

Figure 8:
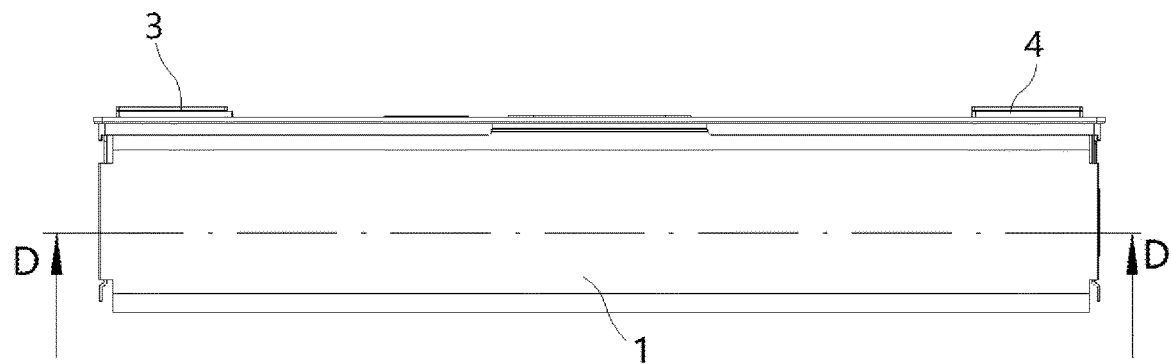
FIG. 8 is a front view of an internal structure of the battery unit of the present disclosure.

As shown in FIG. 12, the supporting plates 52 are arranged on both side ends of the guiding plate 51 along the width direction, so as to improve the welding and fixing reliability with the tab 11 by increasing its own structural strength, and the tab 11 is attached with the outer side face of the supporting plate 52 and is folded back together with the supporting plate 52. FIG. 8 shows a front view of the interior of the battery unit, FIG. 9 shows a schematic diagram of a state in which a D-D location is sectioned and the tab are not folded back in FIG. 8, at this time, the tab 11 is attached with the outer side faces of the supporting plates 52 and is perpendicular to the guiding plate 51. FIG. 10 shows a D-D sectional view in FIG. 8 and is a schematic diagram of a state in which the supporting plate 52 and the tab 11 are folded back. Optionally, the supporting plate 52 is only arranged on one side of the guiding plate 51 along the width direction.

Referring to FIG. 12, the reinforcement portion includes a rib 511, the rib 511 extends along the height direction of the electrode assembly 1 or obliquely extends relative to the height direction, so as to increase the moment of inertia of a section of the guiding plate 51 perpendicular to the height direction of the electrode assembly 1 to the z axis, therefore the bending rigidity of the section of the guiding plate 51 perpendicular to the height direction of the electrode assembly 1 is increased. The rib 511 extending along the height direction can achieve a better reinforcement effect, and the rib 511 can adopt a continuous structure or a discontinuous structure. In addition, the reinforcement portion can also include a plurality of small projections arranged according to a preset rule, etc.

The reinforcement portion includes one rib 511 or a plurality of ribs 511 arranged at intervals, all the ribs 511 are independently arranged, all the ribs 511 can be arranged in parallel along the vertical direction, so that the sectional bending rigidity of the current collecting member on the height direction is relatively uniform, the overall bending deformation amount can be reduced, and the processing difficulty is low. As shown in FIG. 12, the guiding plate 51 is provided with three ribs 511 which are arranged in parallel along the vertical direction. Optionally, the reinforcement portion includes a plurality groups of ribs 511, wherein the ribs 511 in each group are arranged at intervals, and at least two groups of ribs 511 are arranged staggered, for example, all the ribs 511 form transversely staggered or obliquely interlaced grid-like ribs.

Figure 14:
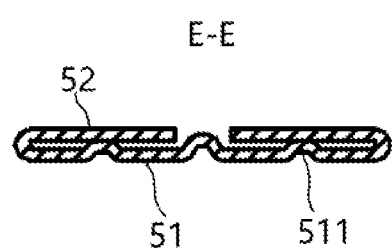
FIG. 14 is an E-E section enlarged view in FIG. 13.

Referring to FIG. 14, for example, one side of the reinforcement portion such as the rib 511 away from the electrode assembly 1 protrudes outward relative to the guiding plate 51. This structure can reduce the space occupied by the reinforcement portion on one side towards the electrode assembly 1, and reduce the deformation amount of the current collecting member without reducing the energy density of the main body portion. Alternatively, the reinforcement portion can also protrude toward one side of the electrode assembly 1.

Figure 13:
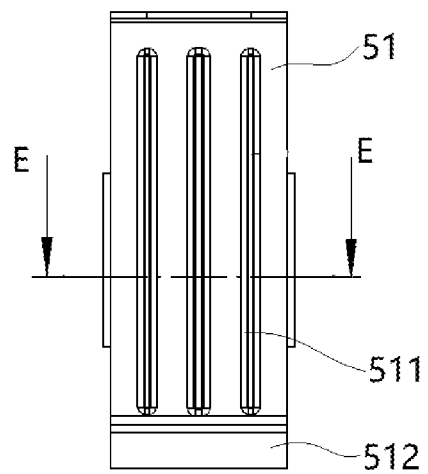
FIG. 13 is a side view of the first current collecting member as shown in FIG. 12.

FIG. 13 is a front view of the current collecting member, FIG. 14 is an E-E section view of FIG. 13, and one side of the rib 511 close to the electrode assembly 1 depresses inward relative to the guiding plate 51. In the working process of the battery unit, the electrolyte generates a gas, after the gas is discharged from the both sides of the electrode assembly 1 along the length direction, the gas flows along a flow path formed by the depression portion of the rib 511 and is discharged from upper and lower locations of the current collecting member, and the depression portion can also buffer the gas discharged from the both sides of the electrode assembly 1, so that the gas in the electrolyte can smoothly escape, bubbles in the electrolyte can be reduced, and a lithium separation phenomenon of the battery unit is prevented.

As shown in FIG. 12, the reinforcement portion crosses the tab 11 along the height area. In FIG. 12, the top of the rib 511 is higher than the top of the tab 11, and the bottom of the rib 511 is lower than the bottom of the tab 11. This structure can increase the sectional bending rigidity of the guiding plate 51 as much as possible, and when the tab 11 and the supporting plate 52 are flattened by the flat plate structure, the deformation amount of the guiding plate 51 towards the main body portion 12 can be reduced as much as possible.

As shown in FIG. 12, the supporting plate 52 includes a connecting portion 521 and a bending portion 522, the bending portion 522 is connected with the guiding plate 51 and is bent into an arc shape, the tab 11 is connected to the connecting portion 521, and is entirely folded back to one side of the guiding plate 51 away from the main body portion 12 along the outer surfaces of the bending portion 522 and the connecting portion 521. For this structure with the tab 11 bent inward, the additional space occupied by the supporting plate 52 on the width direction of the electrode assembly 1 can be avoided, the width size of the battery unit depends on the width of the main body portion 12, so the width size of the battery unit is reduced.

Figure 18:
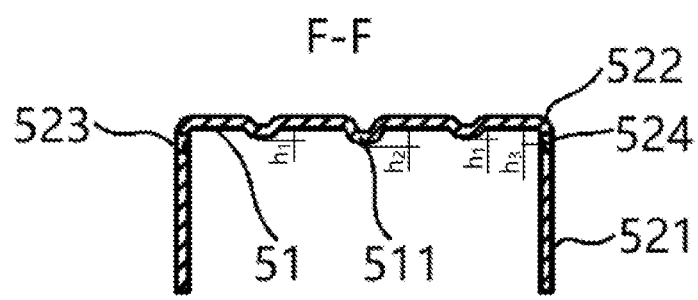
FIG. 18 is an F-F section enlarged view in FIG. 17.

Still referring to FIG. 12 and FIG. 18, the rib 511 includes a first rib 511A, the first rib 511A is covered by the connecting portion 521 on the width direction, the first rib 511A has a first protruding height $h_1$ relative to the guiding plate 51, the bending portion has a third protruding height $h_3$ relative to the guiding plate 51, and the first protruding height $h_1$ is less than or equal to the third protruding height $h_3$. This structure can prevent the connecting portion 521 from tilting up obliquely, so as to avoid the additional space occupied by the current collecting member on the side of the main body portion 12 along the length direction, thus the electrode assembly 1 can be conveniently installed in the shell 8, and an insulating plate can also be conveniently arranged on the outer side face of the tab 11.

As shown in FIG. 12 and FIG. 14, two supporting plates 52 are respectively connected to the both ends of the guiding plate 51 along the width direction and are relatively bent towards each other, and the connecting portions 521 of the two supporting plates 52 are arranged at intervals along the width direction. The rib 511 further includes a second rib 511B, the first rib 511A is provided with two segments, the two segments of first rib 511A are covered by different connecting portions 521, the second rib 511B is located between the two segments of first rib 511A, and the second rib 511B is located in an interval area of the two connecting portions 521. This structure can prevent the second rib 511B from overlapping with the connecting portion 521, and can reduce the occupied space.

Further, the second rib 511B has a second protruding height $h_2$ relative to the guiding plate 51, and the second protruding height $h_2$ is greater than or equal to the first protruding height.

For example, in some embodiments as shown in FIG. 18, one first rib 511A, the second rib 511B and the other first rib 511A are arranged side by side along the width direction, the first protruding heights of the two first ribs 511A are $0 \leq h_1 \leq 2$ mm, preferably $0.3 \leq h_1 \leq 0.9$ mm, the second protruding height of the second rib 511B is $0 \leq h_2 \leq 3$ mm, preferably $0.3 \leq h_2 \leq 2$ mm, and it is necessary to consider both space and reinforcement effects during the design of the first protruding height and the second protruding height.

In this structure, the second rib 511B located in the interval area of the two supporting plates 52 is designed to have a greater protruding height, so that the bending rigidity of an intermediate area of the guiding plate 51 along the width direction can be increased as much as possible, thereby further reducing the deformation amount of the guiding plate 51, and also preventing the tab 11 from tilting up obliquely after being bent. Meanwhile, the first rib 511A covered by the bent supporting plate 52 is designed to have a smaller protruding height, so that the size occupied by the current collecting member on the side of the electrode assembly 1 can be reduced as much as possible while ensuring the bending rigidity of the guiding plate 51, and in the case that the size of the battery unit is constant, the energy density of the electrode assembly can be increased.

Based on the above embodiments, according to the characters of the first current collecting member 5 corresponding to the negative terminal 3 and the second current collecting member 6 corresponding to the positive terminal 4, the first current collecting member 5 and the second current collecting member 6 are designed as different structures.

Figure 5:
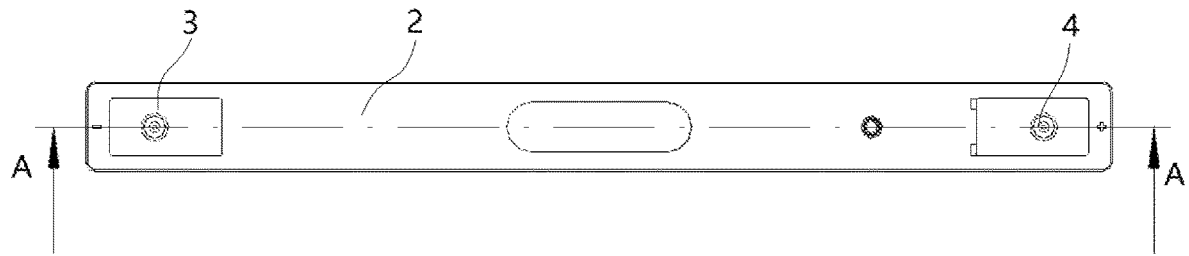
FIG. 5 is a top view of some embodiments of the battery unit of the present disclosure.

Firstly, the applicable embodiments of the first current collecting member 5 are given. FIG. 5 is a top view of the battery unit of the present disclosure, the sectional view as shown in FIG. 6 is formed after being sectioned along an A-A section in FIG. 5, and side view of the first current collecting member 5 and the second current collecting member 6 is illustrated.

Figure 6:
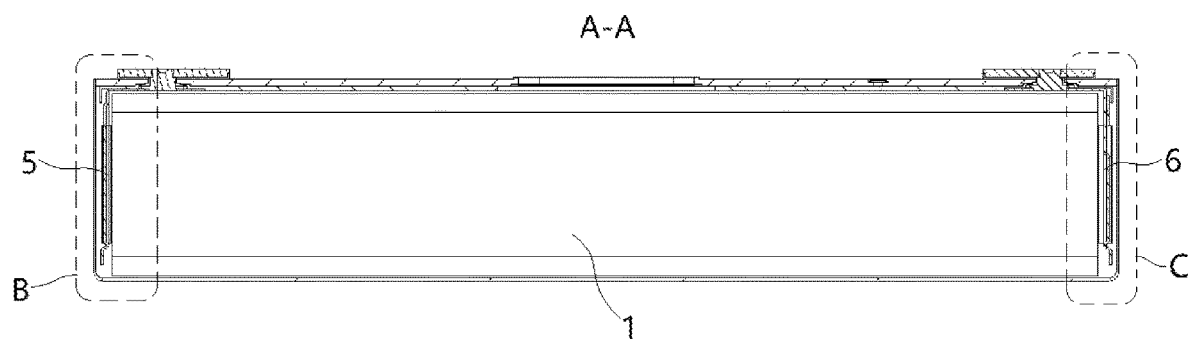
FIG. 6 is an A-A section view of the battery unit as shown in FIG. 5.
Figure 7A:
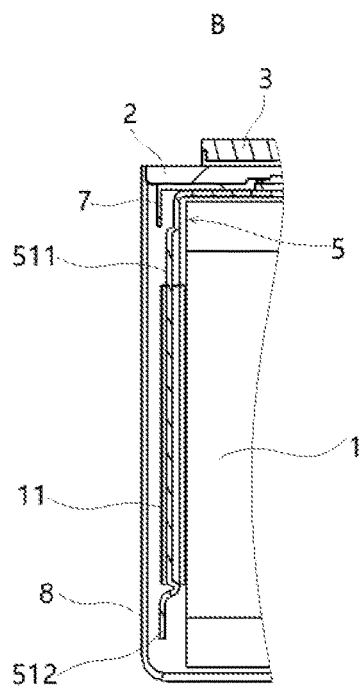
FIG. 7A and FIG. 7B are respectively enlarged views of a location B and a location C in FIG. 6.
Figure 11A:
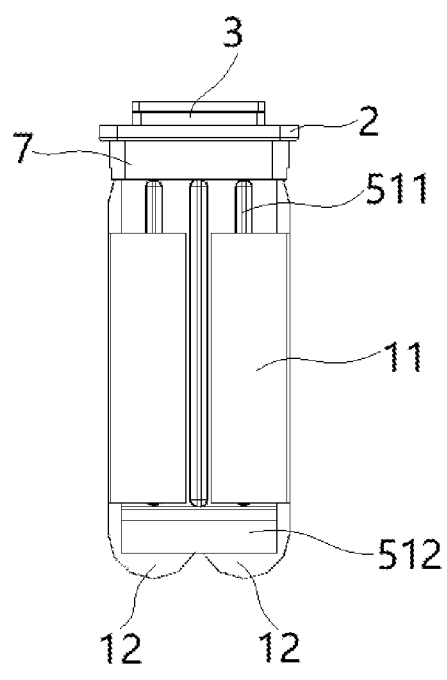
FIG. 11A and FIG. 11B are respectively a left view (corresponding to a positive terminal side) and a right view (corresponding to a negative terminal side) of FIG. 8.
Figure 11B:
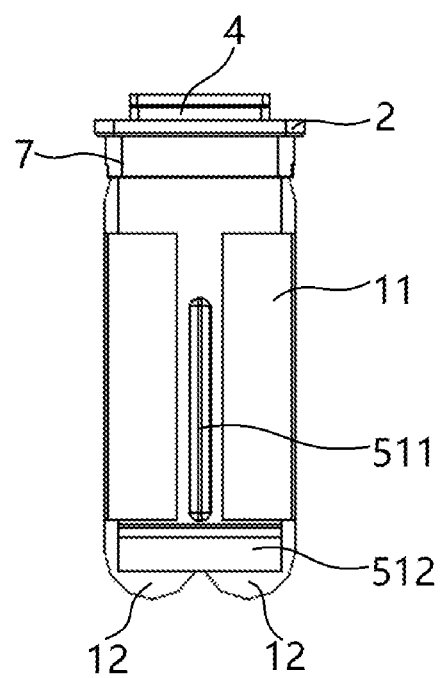

In order to see the specific structure of the first current collecting member 5 more clearly, FIG. 7A is an enlarged view of a location B of FIG. 6. The battery unit further includes a top cover plate 2 and an insulator 7, the electrode terminals are arranged on the top cover plate 2, and the insulator 7 is arranged between the top cover plate 2 and the electrode assembly 1. The two current collecting members include a first current collecting member 5 located on one side of the electrode assembly 1, the two electrode terminals include a negative terminal 3, the first current collecting member 5 connects the tab 11 on the same side with the negative terminal 3, the reinforcement portion of the first current collecting member 5 extends to the bottom of the insulator 7 along the height direction. This structure can lengthen the length of the reinforcement portion such as the rib 511 along the height direction as much as possible while ensuring that the reinforcement portion does not interfere with the insulator 7, thereby increasing the overall rigidity of the current collecting member along the height direction, and maximally reducing the deformation amount when the tab 11 is flattened. As shown in FIG. 11A, the supporting portion 52 partially covers the rib 511 on the height direction.

As shown in FIG. 7A, the current collecting member further includes a clamping portion 512, the clamping portion 512 is arranged at the bottom of the guiding plate 51 and entirely protrudes toward the side away from the electrode assembly 1. In order to play the function of the clamping portion 512, the bottom end of the reinforcement portion extends downward to the top end of the clamping portion 512, and the bottom end of the clamping portion 512 is a free end and remains a protruding height. When it is necessary to flatten the bent tab 11, a tool can be arranged between the clamping portion 512 and the electrode assembly 1 to reduce the deformation amount of the guiding plate 51 towards the main body portion 12 when the tab 11 is flattened.

Specifically, the rib 511 protrudes towards one side away from the electrode assembly 1 relative to the plane of the guiding plate 51, the rib 511 extends along the height direction of the guiding plate 51, the top end of the rib 511 extends upward to the bottom surface of the insulator 7, and the bottom end of the rib 511 extends downward to be connected to the clamping portion 512. This structure can maximally increase the length of the rib 511 along the height direction, thereby increasing the rigidity of the first current collecting member 5 on the entire height direction, and maximally reducing the deformation amount when the tab 11 is flattened.

Figure 7B:
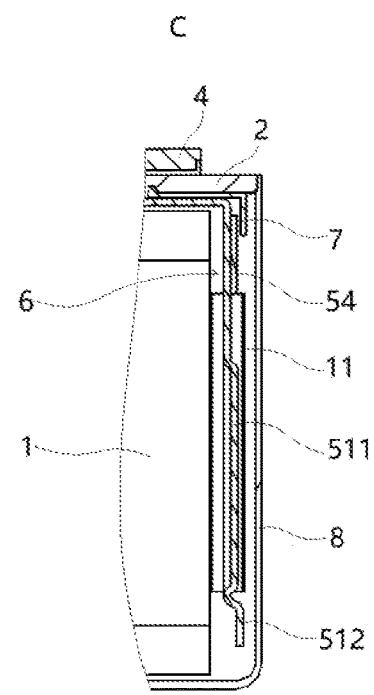

As shown in FIG. 7A and FIG. 7B, on the length direction, the surface of the clamping portion 512 away from the guiding plate 51 is not higher than the surface of the tab 11 away from the guiding plate 51 after being folded back. This structure does not additionally increase the size of the battery unit along the length direction in the case that the clamping portion 512 is provided; and furthermore, when the insulating plate is arranged on the side of the electrode assembly 1 along the length direction, the insulating plate can also be attached with the tab 11, thereby improving the insulating reliability, and the insulating plate can be installed more firmly by increasing the fitting area of the insulating plate.

Next, the applicable embodiments of the second current collecting member 6 are given. As shown in FIG. 7B, the two current collecting members include a second current collecting member 6 located on the other side of the electrode assembly 1, the two electrode terminals include a positive terminal 4, the second current collecting member 6 connects the tab 11 on the same side to the positive terminal 4, the second current collecting member 6 further includes a heat dissipation portion 54, and the heat dissipation portion 54 is arranged in an area of the guiding plate 51 above the tab 11. Since the second current collecting member 6 and the positive terminal 4 are generally made of an aluminum material, and the first current collecting member 5 and the negative terminal 3 are generally made of a copper material, when current flows upward along the guiding plate 51 of the second current collecting member 6 to the adapter plate 53, it needs to pass through the bent structure, thus generating a large amount of heat, the heat dissipation performance of aluminum is inferior to that of the copper, by disposing the heat dissipation portion 54, the heat release can be accelerated, the situation that a local temperature of the second current collecting member 6 is too high to affect the battery performance is avoided, and the working safety of the battery unit is improved. Moreover, by disposing the heat dissipation portion 54, the effect of improving the rigidity of the second current collecting member 6 can also be achieved.

Figure 15:
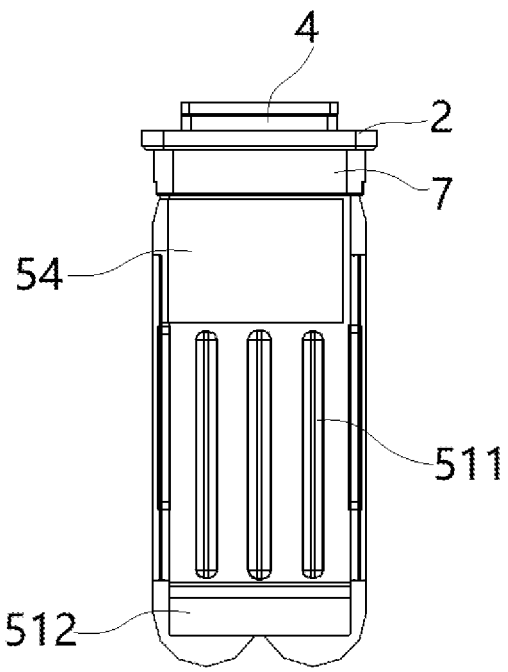
FIG. 15 is a side view of some embodiments of a second current collecting member (corresponding to a negative terminal) in the battery unit of the present disclosure.

As shown in FIG. 15, the heat dissipation portion 54 includes a thickened portion, and the thickened portion is arranged on the side of the guiding plate 51 away from the electrode assembly 1. For example, a heat dissipation rib or the like can be arranged on the thickened portion to further optimize the heat dissipation effect by increasing the heat dissipation surface. The protruding direction of the reinforcement portion and the thickened portion is the same with respect to the guiding plate 51, so that the occupation space of the second current collecting member 6 on the length direction can be reduced to improve the energy density of the battery unit.

For example, the thickened portion can adopt a rectangular platy structure and is located in an upper area of the guiding plate 51, the width of the thickened portion is adapted to the width of the guiding plate 51 to optimize the heat dissipation effect by increasing the heat dissipation surface area. The thickened portion can be connected to the guiding plate 51 by welding, or the thickened portion can be attached and fixed with the guiding plate 51 by folding.

Still referring to FIG. 15, the reinforcement portion of the second current collecting member 6 extends to the bottom surface of the heat dissipation portion 54 along the height direction. For example, the top end of the rib 511 extends to the vicinity of the bottom of the thickened portion, and the bottom end of the rib 511 extends to the vicinity of the clamping portion 512. This structure can simultaneously consider the heat dissipation and rigidity of the second current collecting member 6, and on the basis of ensuring the heat dissipation effect, the length of the rib 511 along the height direction can be maximized, thereby improving the rigidity of the first current collecting member 5 and reducing the deformation amount when the tabs 11 are flattened.

Figure 16:
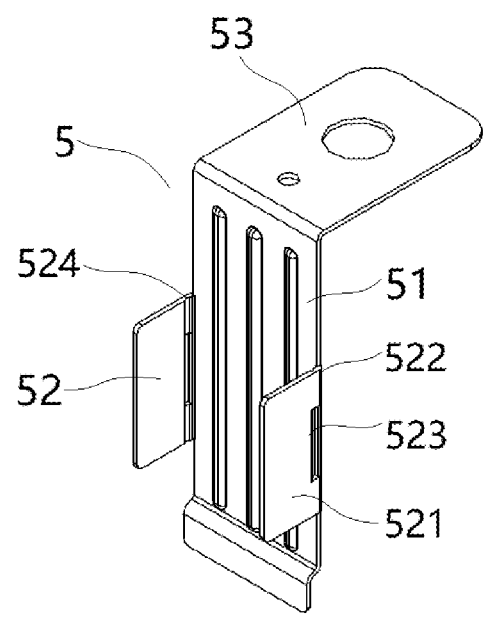
FIG. 16 is a perspective view of other embodiments of the current collecting member in the battery unit of the present disclosure.
Figure 17:
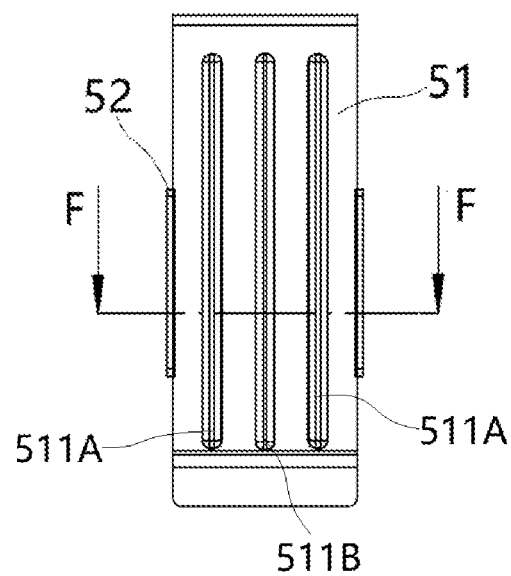
FIG. 17 is a side view of the current collecting member as shown in FIG. 16.

As shown in FIG. 16, the bending portion 522 is provided with at least one of a slot 523 and a groove 524 extending along the height direction, the slot 523 is formed in an intermediate area of the bending portion 522 along the height direction, for example, an elongated rectangular groove extending along the height direction is adopted, since the stress area is reduced, the strength of the bending portion 522 can be reduced under a constant pressure, the stress generated during the bending is smaller, and the size of the slot 523 should not be too small to ensure the overflow requirements of the current collecting member. The groove 524 is formed on the inner side of the bending portion 522 and is located in at least one of an area above the slot 523 and an area below the slot 523, for example, the groove is a nick that is arranged on the inner side of the bending portion 522 and extend along the height direction, and the nick can assist in weakening the strength of the bent area and can accurately locate the bent location. FIG. 17 is a front view of the current collecting member, and FIG. 18 is an F-F section view in FIG. 17.

This structure can reduce the strength of the supporting plate 52 in the bent area, so as to make the supporting plate 52 of the current collecting member can be fold back easily, and can prevent the stress applied to the bent area from being transferred to other areas of the current collecting member as much as possible in a folding back process, so as to protect the mechanical damage to the electrode assembly 1 and to improve the electrochemical performance in the battery unit.

In order to illustrate the effects of various improvements of the present disclosure, the advantages analyzed is made by comparing experimental data. The following experimental data are given for the embodiments in which the current collecting members are arranged on the both sides of the supporting plates 52. In the folding process of the tab 11 and the supporting plates 52, pre-folding and final folding are included, the pre-folding is to fold the supporting plates 52 perpendicular to the guiding plate 51 inward for partial angles, and the final folding is to continue to fold back the supporting plates 52 inward in place. In this process, the deformation amount of the intermediate area of the guiding plate 51 along the height direction is detected by using a dial indicator.

In order to individually compare the effects of each structural improvement in the experiment, four experimental groups are given. In a Base group, the reinforcement portion is not arranged on the guiding plate 51 of the current collecting member, and only the clamping portions are arranged on the upper and lower areas of the tab 11; in a group A, three segments of ribs 511 are arranged on the outer side face of the guiding plate 51 along the height direction, and the ribs 511 extend to locations adjacent to the upper and lower clamping portions; a group B is compared with the A group and the difference lies in that the thickened portion is arranged on the outer side face of the top area of the guiding plate 51 to serve as the heat dissipation portion 54; and a group C is compared with the A group and the difference lies in that the slot 523 is formed in the bent area of the supporting plate 52. The following table 1 shows deformation amounts of the first current collecting member 5 and the second current collecting member 6 toward the electrode assembly 1 after being folded back.

TABLE 1

Deformation amount of the current collecting member in the folding back process

| Group | First current collecting member 5/mm | | Second current collecting member 6/mm | |
| --- | --- | --- | --- | --- |
| | Pre-folding | Final folding | Pre-folding | Final folding |
| Base group | 1.80 | 1.99 | 2.10 | 2.21 |
| Group A | 1.17 | 1.32 | 1.30 | 1.35 |
| Group B | 1.08 | 1.09 | 0.96 | 0.93 |
| Group C | 0.71 | 0.31 | 0.49 | 0.35 |

It can be seen from Table 1 that, on the basis of the Base group, the deformation amount of the guiding plates 51 in the two current collecting members can be reduced by adding the ribs 511 in the group A; on the basis of the group A, the deformation amount of the guiding plates 51 can be further reduced by replacing the upper clamping portion with the heat dissipation portion 54 in the group B; and on the basis of the group A, the deformation amount of the guiding plates 51 can be further reduced by adding the slot 523 in the group C. It can be found by comparison that the ribs 511 have the most significant effect of reducing the deformation amount of the guiding plates 51. Therefore, in some specific embodiments, the ribs 511, the heat dissipation portion 54 and the slot 523 can be set at the same time to maximally reduce the deformation amount of the guiding plates 51; or, in other embodiments, one of the heat dissipation portion 54 and the slot 523 can be set on the basis of the rib 511.

The variance of the deformation amount of the guiding plate 51 is given below by table 2 by testing the plurality of battery units.

TABLE 2

Standard difference of the deformation amount of the guiding plate 51 of the current collecting member after being folded back

| Group | First current collecting member 5 | Second current collecting member 6 |
| --- | --- | --- |
| Base group | 0.23 | 0.34 |
| Group A | 0.18 | 0.28 |
| Group B | 0.05 | 0.17 |
| Group C | 0.07 | 0.16 |

It can be seen from Table 2 that, by testing multiple samples, on the basis of the Base group, the variance of the deformation amount of the guiding plates 51 in the two current collecting members can be reduced by adding the ribs 511 in the group A; on the basis of the group A, the variance of the deformation amount is further reduced by replacing the upper clamping portion by the heat dissipation portion 54 in the group B; and on the basis of the group A, the variance of the deformation amount is further reduced by adding the slot 523 in the group C. Therefore, by means of the structural improvement of the present disclosure, the deformation amount of the guiding plate 51 can be relatively stable, the precision requirements on a tool fixture can be reduced, and the stability of the batch production can be improved.

The battery unit and the battery module provided by the present disclosure are described in detail above. The principles and embodiments of the present disclosure have been described herein with reference to specific embodiments, and the descriptions of the above embodiments are only used for helping to understand the method of the present disclosure and its core idea. It should be noted that, for those of ordinary skill in the art, several improvements and modifications can be made to the present disclosure without departing from the principles of the present disclosure, and these improvements and modifications also fall within the protection scope of the claims of the present disclosure.

The invention claimed is:
1. A battery unit, comprising:
an electrode assembly, comprising a main body portion and tabs extending from ends of the main body portion along a length direction of the electrode assembly;
two electrode terminals arranged at a top of the electrode assembly; and two current collecting members electrically connecting the tabs on the ends of the main body portion with the two electrode terminals, respectively;

wherein each of the two current collecting members comprises a guiding plate and a supporting plate, wherein the guiding plate is located on one end of the ends of the main body portion along the length direction and extends along a width direction of the electrode assembly, wherein a reinforcement portion is arranged on the guiding plate and is configured to reduce the deformation of the guiding plate towards the main body portion, wherein the supporting plate is connected to an end of the guiding plate along the width direction, and the tabs on the one end are attached with an outer side of the supporting plate and bent together with the supporting plate relative to the length direction, wherein the reinforcement portion comprises a plurality of ribs including a first rib and a second rib, wherein each of the plurality of ribs protrudes out of the guiding plate and away from the main body portion to reduce the deformation of the guiding plate towards the main body portion when the supporting plate is being bent, wherein the first rib is configured to support the supporting plate and allow the supporting plate to be substantially parallel to the guiding plate when being bent, and the first rib has a first protruding height $h_1$ relative to the guiding plate, and wherein the second rib is configured to prevent the supporting plate from overlapping with the second rib when the supporting plate is being bent, the second rib has a second protruding height h2 relative to the guiding plate, and the second protruding height h2 is greater than the first protruding height $h_1$, and wherein the tabs on the one end comprise a first tab segment and a second tab segment, two ends of the first tab segment respectively being connected to the main body portion and the second tab segment, the second tab segment being connected to the supporting plate, and the supporting plate being located between the second tab segment and the reinforcement portion along the length direction.

2. The battery unit according to claim 1, wherein the first rib extends along a height direction of the electrode assembly or extends obliquely relative to the height direction.

3. The battery unit according to claim 2, wherein the reinforcement portion further comprises a plurality of groups of ribs, wherein the ribs in each group are arranged at intervals, and at least two of the plurality of groups of ribs are arranged staggered.

4. The battery unit according to claim 2, wherein one side of the first rib adjacent to the electrode assembly recesses inward relative to the guiding plate.

5. The battery unit according to claim 1, wherein one side of the reinforcement portion away from the electrode assembly protrudes outward relative to the guiding plate.

6. The battery unit according to claim 5, wherein the supporting plate comprises a connecting portion and a bending portion, the bending portion is connected with the guiding plate and is bent into an arc shape, and the tab is connected to the connecting portion and is entirely folded along the surface of the bending portion to one side of the guiding plate away from the main body portion.

7. The battery unit according to claim 6, wherein the first rib is covered by the connecting portion on the width direction, the bending portion has a third protruding height $h_3$ relative to the guiding plate, and the first protruding height $h_1$ is less than or equal to the third protruding height $h_3$.

8. The battery unit according to claim 7, wherein each of the two current collecting members comprises two supporting plates, the two supporting plates are respectively connected to two ends of the guiding plate along the width direction and are bent towards each other, and the respective connecting portions of the two supporting plates are arranged at intervals along the width direction; and two segments of the first rib are covered by the two connecting portions, the second rib is located between the two segments of first rib, and the second rib is located in an interval area of the two connecting portions.

9. The battery unit according to claim 6, wherein the bending portion is provided with a slot extending along a height direction of the electrode assembly, the slot is arranged in an intermediate area of the bending portion along the height direction; or the bending portion is provided with a slot and a groove extending along a height direction of the electrode assembly, the slot is arranged in an intermediate area of the bending portion along the height direction, and the groove is arranged on an inner side of the bending portion and is located in at least one of an area above the slot and an area below the slot.

10. The battery unit according to claim 1, wherein the reinforcement portion crosses the supporting plate along a height direction of the electrode assembly.

11. The battery unit according to claim 1, further comprising a top cover plate and an insulator arranged between the top cover plate and the electrode assembly, the electrode terminals are arranged on the top cover plate; and the two current collecting members comprise a first current collecting member located on one end of the ends of the electrode assembly, the two electrode terminals comprise a negative terminal, the first current collecting member connects the tabs on the one end with the negative terminal on the one end, and the reinforcement portion of the first current collecting member extends to a bottom of the insulator along a height direction of the electrode assembly.

12. The battery unit according to claim 1, wherein the two current collecting members comprise a second current collecting member located on one end of the ends of the electrode assembly, the two electrode terminals comprise a positive terminal, the second current collecting member connects the tabs on the one end to the positive terminal on the one end, the second current collecting member further comprises a heat dissipation portion which is arranged in an area of the guiding plate located above the supporting plate.

13. The battery unit according to claim 12, wherein the reinforcement portion of the second current collecting member extends to a bottom of the heat dissipation portion along a height direction of the electrode assembly.

14. The battery unit according to claim 1, wherein the current collecting member further comprises a clamping portion, and the clamping portion is arranged at a bottom of the guiding plate and entirely protrudes toward one side away from the electrode assembly.

15. The battery unit according to claim 14, wherein along the length direction, a surface of the clamping portion away from the guiding plate is not higher than the surface of the tabs away from the guiding plate after being folded back.

16. A battery module, comprising:
a plurality of battery units according to claim 1, wherein the battery units are arranged side by side along the width direction.

\* \* \* \* \*